United States Patent [19]

Shelley

[11] Patent Number: 4,635,710

[45] Date of Patent: Jan. 13, 1987

[54] LINEAR RADIANT CEILING PANEL

[76] Inventor: William Shelley, 456 W. Frontage Rd., Northfield, Ill. 60093

[21] Appl. No.: 576,158

[22] Filed: Feb. 2, 1984

[51] Int. Cl.$^4$ .................... F24D 19/02; F24D 19/06; F28F 1/20
[52] U.S. Cl. ........................................ 165/49; 165/56; 165/171
[58] Field of Search .................. 165/56, 53, 49, 57, 165/171

[56] References Cited

U.S. PATENT DOCUMENTS

| | | | |
|---|---|---|---|
| 3,043,567 | 7/1962 | Bergh et al. | 165/56 |
| 3,366,170 | 1/1968 | Welz | 165/171 |
| 4,080,703 | 3/1978 | Beck, Jr. | 165/171 |
| 4,098,261 | 7/1978 | Watt | 165/171 |
| 4,338,995 | 7/1982 | Shelley | 165/171 |

FOREIGN PATENT DOCUMENTS 1223182  2/1971  United Kingdom .................. 165/49

Primary Examiner—William R. Cline
Assistant Examiner—John K. Ford
Attorney, Agent, or Firm—Conlon & Kerstein

[57] ABSTRACT

A linear radiant ceiling panel and method of manufacturing and providing a plurality of elongated, extruded panels located in spaced relationship and comprising an extruded aluminum plate member having a saddle adapted to receive and hold a copper tube having heat conducting fluid circulating therein. The extruded plates have channels on each side of the saddle to receive a fastener and connect the plates to a supporting grid structure in a room. The side margins of the channel are adapted to connect with a removable linear sheet metal member which is a thin piece of metal that connects to the outer surface of the extruded sheet to provide an attractive, replaceable ceiling component exposed to the interior of a room.

6 Claims, 2 Drawing Figures

LINEAR RADIANT CEILING PANEL

BACKGROUND OF THE INVENTION

(1) Field of the Invention

This disclosure pertains to a radiant panel which may be used for both heating and cooling in a building. More specifically, the panel provided herein uses an extruded, elongated plate which is located in a ceiling with other panels in a spaced relationship, providing openings between the adjacent panels. The extruded plates are attached directly to suspended crossbraces and a snap-on sheet metal liner is attached to the room side surface of the extruded member.

(2) Description of the Prior Art

The extruded aluminum panels shown in the prior art are exemplified by the Shelley U.S. Pat. No. 4,338,995 (1982) which discloses a number of interlocking aluminum sheets joined in side by side fashion and suspended from a supporting grid structure. Another type of similar panel is shown in the Beck U.S. Pat. No. 4,080,703 (1978) which shows an extruded aluminum panel also joined edge to edge and having upstanding saddles on the back surface to receive copper tubes. The deformed saddles are crimped about the tube, and deformed at an elevated temperature to mechanically secure the copper tubes in place. These patents do not show a so-called linear radiant ceiling which refers to an inside ceiling configuration having the appearance of linear members arranged in spaced relationship and uninterrupted by the usual air vents or exhaust openings.

Linear ceilings have been used more extensively in Europe than in the United States and provide sheet metal liners clipped directly to a supporting grid structure. Linear ceilings have not been used with radiant panels having copper tubes attached to extruded aluminum radiant plates and attached directly to the supporting, suspended crossbraces. Linear ceilings were designed for use as a radiant ceiling; however, the construction suggested merely mounts a copper tube under a supporting grid member and then uses the grid member and the tube for attachment of the clip-on, linear panel. Such construction is shown in a brochure provided by the Hunter Douglas Company of Rotterdam, Holland.

The linear ceiling which utilizes the copper tube to attach the clip-on linear sheet member is inefficient because there is very little contact between the tube which circulates hot and/or cold water on the sheet. The structure shown herein provides a linear ceiling with highly efficient radiant panel construction which is achieved by using a saddle to attach fluid circulating whereby radiant heat can be provided to the room and/or the room can also be cooled by the radiant structure shown herein. A decorative sheet linear covers the extruded plate.

SUMMARY OF THE INVENTION

The radiant panel construction disclosed may be used for heating or cooling. Long, narrow extruded aluminum plates are provided with a centrally located saddle which receives a copper tube. Before fitting the tube into the saddle, a layer of heat conducting filler material is located in the saddle and acts to improve heat transfer characteristics between the tube and the extruded aluminum panel by providing full surface contact between the lower half of the tube and the saddle. The filler material enlarges the area for heat transfer between the tube and saddle from the small area which would exist if only bare metal contact existed between the saddle and tube. After the tubing is in place, crossbraces are attached to the extruded panel and fasteners are inserted through the crossbraces and into elongated channels located in the aluminum plate. It is contemplated that the elongated channels will have a saw-tooth type of configuration which mates with the threads of the fasteners to allow the ceiling construction of a number of panels to be assembled quickly and reliably. After the initial construction is completed, a snap-on linear sheet is attached over each extruded panel section and held in place by the spring properties of the snap-on sheet which has upturned edges which fit about the comparably upturned edges of the extruded plates. Once the extruded plates are fastened in the ceiling grid system, the linear sheets can be attached with the use of a thermally conductive adhesive which eliminates air pockets between the plate and sheet. If no adhesive is used, the panels may later be easily removed for cleaning or replacement should it be necessary to change the color or material or finish of the linear panel. The linear sheets conceal surface irregularities in the extruded plates and produce an attractive ceiling.

Linear ceiling constructions are desirable because they are very attractive and do not require the usual unsightly openings for air ducts and vents. Because the supporting grid structure is darker than the panel it is virtually invisible through the openings between the spaced panel members. Further, the spaces between each linear panel can be used to circulate air into a room at a very even fashion to evenly heat and cool when required. Thus, the hot and cold spots directly below outlet air ducts are eliminated.

It is thus an object of this disclosure to show a linear ceiling utilizing a number of elongated, extruded aluminum plate members with copper tubing attached in saddles and secured to a grid system in spaced relationship whereby a linear snap-on sheet can easily be attached to the extruded member.

Another object of this disclosure is to provide an extruded aluminum ceiling plate member which can be easily and quickly attached to a supporting grid system by utilizing integrally formed channels which receive fasteners extending through the supporting grid carrier bars.

Yet another object of this disclosure is to show a linear radiant ceiling panel having an extruded plate covered with a sheet member and joined thereto in heat transfer relationship with a heat conducting material.

These and other objects of the disclosure will become apparent to those having ordinary skill in the art with reference to the following description, drawings and appended claims.

DESCRIPTION

Figure 1:
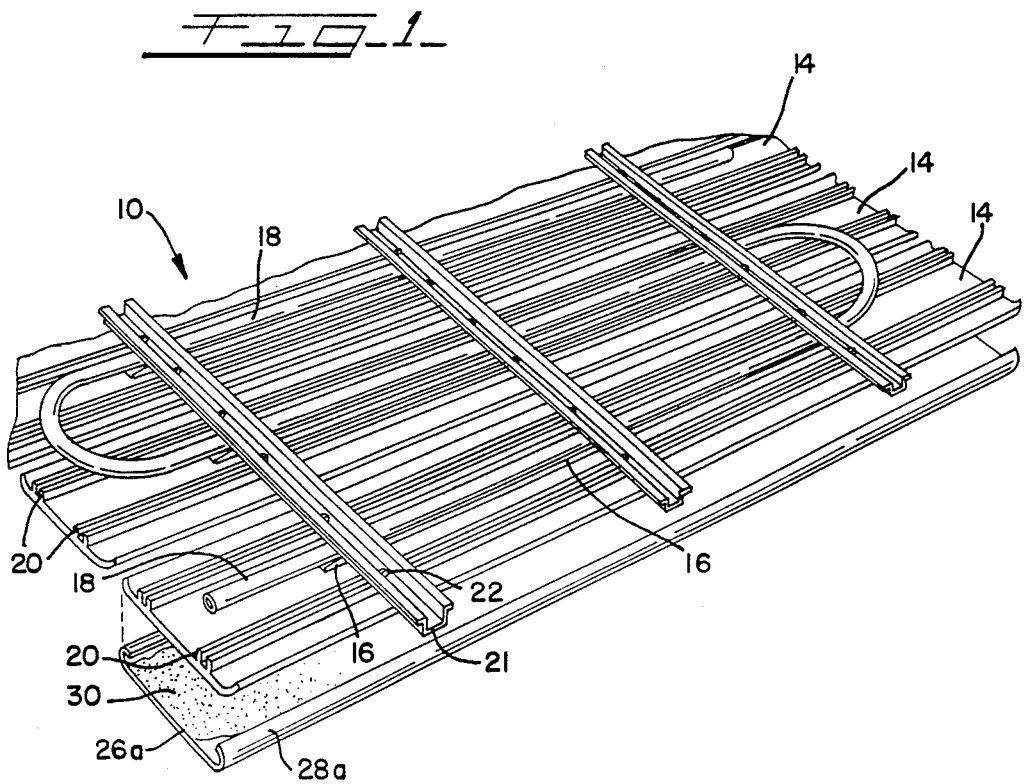
FIG. 1 is an exploded pictorial illustration of a plurality of linear panels and the supporting crossbrace members; and, FIG. 2 is a sectional view of the panel construction shown in FIG. 1.

A linear radiant ceiling is indicated by the numeral 10 and is shown in FIG. 1 as a portion of a larger room structure. It is to be understood that a typical room would have numbers of these panels. Supporting grid members are designated by the numeral 12 and are merely rigid steel members which are suspended from supporting members in a ceiling structure (not shown). The radiant ceiling consists of an extruded plate 14 having a centrally disposed saddle 16 which has a rounded contour conforming with the contour of the copper tube 18 through which heat conducting fluid will circulate. It should be noted that the panel construction with the copper tube 18 is adapted for both heating and cooling purposes. The extruded plate 14 also includes a pair of integrally formed channels 20 having upstanding legs spaced about an opening which has saw-tooth sides adapted to receive and connect with a threaded portion of fastener 22. Thus, when the fasteners 22 are inserted through openings in the carrier frames 12 and tightened, the plate 14 will be drawn towards the carrier 12 until the copper tube 18 strikes the underside 21 of the carrier 12. When this occurs, the tube is forced into the saddle 16. An adhesive 23 is located in the saddle 16 and as this tightening of the fasteners 22 occurs the adhesive is evenly spaced to provide full contact between the bottom half of the tube and the saddle 16. After assembly the adhesive will harden and continue to provide not only attachment between the copper tube and the saddle 16, but also improve heat transfer characteristics between the two members by evacuating and forcing out air between the tube and saddle.

A non-hardening filler material can also be used and provides no significant adhesion between the tube and saddle yet improves heat transfer characteristics and eliminates air bubbles.

The extruded plate 14 has side edges which are upturned (curved) as indicated by the numeral 24. A snap-on linear sheet which is generally contemplated as a thin aluminum sheet member is designated by the number 26 and has rounded side margins. Thus, the linear sheet 26 is easily attached to the plate 14 and held in place by its spring properties and due to the fact that the sides 28 overlap sides 24 of the plate 14.

Figure 2:
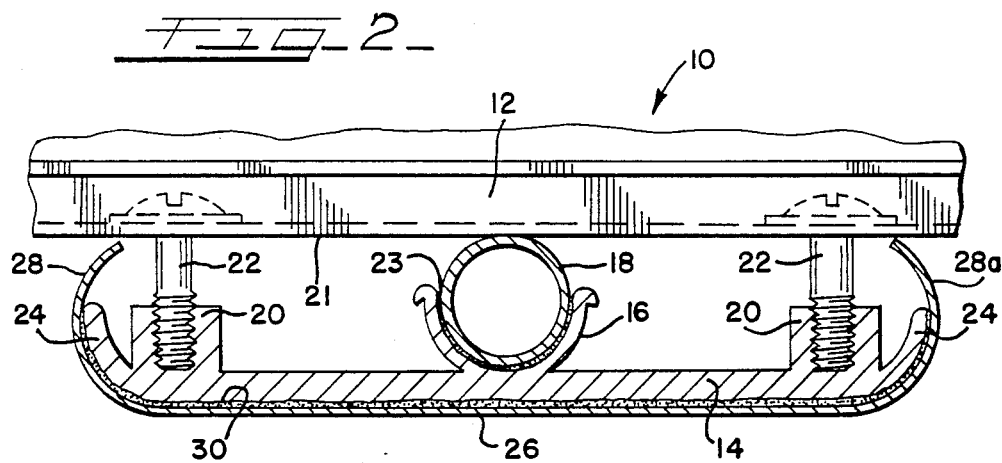

A filler material 30 (FIG. 2) may be used between the plate 14 and the snap-on sheet 26 to eliminate air spaces and improve heat transfer between the two members.

It has been shown by the foregoing that an attractive, linear radiant ceiling can be constructed to provide the aesthetic benefits of a linear ceiling construction with the thermal desirabilities of a radiant ceiling which provides for a very even heating and cooling with the usual hot spots and cold spots associated with outlet registers which pour hot and cold air into a room in an uneven manner. The outer linear panel can easily be removed for cleaning or replacement if the owner desires to utilize a different color scheme or appearance in a room.

The foregoing description and drawings merely explain and illustrate the invention and the invention is not limited thereto, except insofar as the appended claims are so limited, as those who are skilled in the art and have the disclosure before them will be able to make modifications and variations therein without departing from the scope of the invention.

I claim:

1. A linear radiant ceiling panel used in a ceiling system for heating and/or cooling an inside room of a building by circulation of a heat transfer fluid through a pipe, the improvement comprising:
   an extruded aluminum plate having a longitudinal axis extending the length thereof and also having first, flat surface and having a back with a rounded saddle formed therein and the saddle having means to receive and hold said pipe in heat transfer relationship for heat transfer between said heat transfer fluid and the aluminum plate, and, further, said saddle and pipe of the aluminum plate extending parallel with said longitudinal axis of the aluminum plate;
   said extruded plate having up-standing channels forming trough shaped attachment members with up-standing legs on each side of said saddle and said upstanding legs providing gripping means to receive and hold a fastener for attaching the ceiling panel in said ceiling system;
   said extruded plate having side edges extending parallel to the longitudinal axis of the plate and located outwardly of the up-standing channels;
   a snap-on flexible, metal linear sheet adapted to extend across the first, flat surface of the extruded plate and along the axis thereof, said linear sheet having contoured edge means providing side margins which snap-on and grip the side edges of the aluminum plate to securely join the linear sheet to the aluminum plate and provide contact between the flexible, metal linear sheet and the first, flat surface of the aluminum plate to thereby allow heat transfer between the extruded aluminum plate and the sheet.

2. The linear radiant ceiling panel of claim 1, and said sheet adjacent the plate having air pockets and no full contact between the plate and sheet and:
   means for improving heat transfer between the plate and the sheet comprising means flowable therebetween to fill air pockets and voids to produce a continuous heat transfer section to conduct heat from the plate to the sheet to radiate from the exposed surface of the sheet into said room.

3. A linear radiant ceiling comprising a plurality of extruded panels arranged in side by side, spaced relationship for heating and/or cooling an inside room of a building by circulating a heat transfer fluid in a pipe and without the use of the usual air registers or return ducts, the improvement comprising:
   each panel comprising an extruded aluminum plate having a longitudinal axis extending the length thereof and a first, flat surface oriented toward the inside of the room and also having a back with a means to receive said pipe in heat transfer relationship and including a rounded saddle integrally formed therein said saddle and pipe extending parallel with said longitudinal axis of the aluminum plate; said aluminum plate also having side edges extending parallel to the longitudinal axis of the plate and spaced from the side edges of the adjacent panels to provide a ceiling with a striped, linear appearance and to permit air flow between the spaced panels;
   said pipe comprising a copper tube nested within said saddle, said copper tube being constructed to carry the heat transfer fluid and transfer heat through the extruded aluminum plate via the saddle;
   said extruded aluminum plate including integrally formed connecting channels having means to receive a fastener means;
   carrier bar means extending transversely across said ceiling panels and being suspended in the room to connect with and mount said extruded aluminum plates with said fastener means attached in the connecting channels;

fastener means joining the carrier bar means to the plate means and fitting into said connecting channels for securely holding the aluminum plates in side by side, spaced relation within said room;

a removable snap-on, flexible, metal linear sheet extending across the first, flat surface of each extruded plate and along the axis thereof, said linear sheet having contoured edge means providing side margins which snap-on and grip the side edges of the aluminum plate to securely join the linear sheet to the aluminum plate in a manner which provides contact between the linear sheet and the aluminum plate for transfer of heat from the aluminum plate and the linear panel.

4. The radiant ceiling of claim 3 wherein channels comprise:
extruded, serrated grooves extending continuously for the length of the channels forming said means to receive a fastener means.

5. The radiant panel of claim 3, wherein said saddle comprises:
   a generally round section providing a seat conforming with the contour of said copper tube;
   a heat conducting filler located in the seat portion of the saddle and improving heat flow between the heat conducting fluid within the tube and the radiant panel.

6. The linear radiant ceiling of claim 3, and said sheet adjacent the plate having air pockets and no full contact between the plate and sheet and:
   means for improving heat transfer between the plate and the sheet comprising means flowable therebetween to fill air pockets and voids to produce a continuous heat transfer section to conduct heat from the plate to the sheet to radiate from the exposed surface of the sheet into said room.

* * * * *